United States Patent
Yeskel et al.

(10) Patent No.: US 9,590,942 B1
(45) Date of Patent: Mar. 7, 2017

(54) CONTEXT AND CONTENT IN NOTIFICATIONS

(75) Inventors: Zachary Yeskel, San Francisco, CA (US); Brett Rolston Lider, San Francisco, CA (US); Alison Boncha, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 383 days.

(21) Appl. No.: 13/620,320

(22) Filed: Sep. 14, 2012

Related U.S. Application Data (60) Provisional application No. 61/569,756, filed on Dec. 12, 2011.

(51) Int. Cl.
  *G06F 15/16* (2006.01)
  *H04L 12/58* (2006.01)
(52) U.S. Cl.
  CPC .............. *H04L 51/32* (2013.01); *H04L 51/24* (2013.01)

(58) Field of Classification Search
  None
  See application file for complete search history.

(56) References Cited

U.S. PATENT DOCUMENTS

| | | | |
|---|---|---|---|
| 2008/0162510 A1* | 7/2008 | Baio | G06Q 30/02 |
| 2010/0146054 A1* | 6/2010 | Armstrong et al. | 709/205 |
| 2010/0306249 A1* | 12/2010 | Hill et al. | 707/769 |
| 2012/0060105 A1* | 3/2012 | Brown et al. | 715/753 |
| 2012/0150970 A1* | 6/2012 | Peterson et al. | 709/206 |

* cited by examiner

*Primary Examiner* — Mohamed Ibrahim
(74) *Attorney, Agent, or Firm* — McDermott Will & Emery LLP (57) ABSTRACT

A system and method is disclosed for informing a user of recent activities in an online social network. A notification list, displayed in the online social network, includes one or more visual references, with each visual reference displaying at least one line of context information and at least one line of content information. The context information may include a part of a message describing an original activity performed by a user in the online social network, and the content information may include a concise representation of one or more ancillary activities made by other users in response to the original activity.

20 Claims, 5 Drawing Sheets

CONTEXT AND CONTENT IN NOTIFICATIONS

CROSS-REFERENCES TO RELATED APPLICATIONS

This application claims priority from U.S. Provisional Application No. 61/569,756, entitled "Context and Content in Notifications," and filed Dec. 12, 2011, which is incorporated herein by reference in its entirety

BACKGROUND

The subject technology relates generally to social networks, namely notifications for social networks. Generally, a social network may provide a user, outside the user's activity stream, with a notification list of actions performed by other users in the user's social graph. Each notification in the notification list may include a link to a message posted to the activity stream.

SUMMARY

The subject technology provides a system and method for informing a user of recent activities in an online social network. According to one aspect, a computer-implemented method may include receiving one or more first messages in an online social network, the one or more first messages describing a user-related activity, receiving multiple second messages in the online social network, the multiple second messages each describing one or more respective ancillary activities responsive to the user-related activity, generating a description of the user-related activity based on at least a portion of the one or more first messages, generating a description of ancillary activities associated with the user-related activity based on at least a portion of each of the multiple second messages, and providing for display in the online social network a visual representation of the one or more user-related activities or the one or more ancillary activities, the visual representation including the description of the user-related activity and the description of ancillary activities. Other aspects include corresponding systems, apparatus, and computer program products.

The previously described aspects and other aspects may include one or more of the following features. For example, providing the visual representation for display may comprise, on receiving the multiple second messages, generating a notification list that includes the visual representation, and providing the notification list for display within the web browser, above and at least partially overlapping a portion of a webpage related to the online social network. In this respect, the method may comprise assigning to the visual representation a priority in the notification list with respect to other visual representations, the priority based on a type of the user-related activity or an associated ancillary activity. Additionally or in the alternative, at least a portion of the description of ancillary activities may be automatically deemphasized within the visual representation on a subsequent display of the visual representation or the notification list. The description of ancillary activities may comprise multiple activity representations of respective ancillary activities, the multiple activity representations displayed in order according to a priority of the respective ancillary activities.

In another aspect, the computer-implemented method may include providing to a web browser a control for displaying a notification list, receiving an indication that the control was activated, and, on an indication that the control was activated, providing the notification list for display within the web browser, above and at least partially overlapping a portion of a webpage related to the online social network. The notification list may include one or more visual references, with each visual reference displaying at least one line of context information and at least one line of content information, the context information including a part of a message describing one or more original activities performed by a user in the online social network, and the content information including a concise representation of one or more ancillary activities made by other users in response to one or more original activities. Other aspects include corresponding systems, apparatus, and computer program products.

The previously described aspects and other aspects may include one or more of the following features. For example, each visual reference may include a link to a display of the one or more original activities and the one or more ancillary activities. One or more viewed ancillary activities may be automatically deemphasized on a subsequent view of the visual reference and the one or more viewed ancillary activities by the interested user. A viewed visual reference may be removed from the notification list a predetermined amount of time (for example, three days) after the visual reference is viewed by the interested user. The method may further include using a predetermined number of lines for displaying a message related to a recent one of the one or more ancillary activities if the one or more ancillary activities can be displayed without increasing a total number of lines used to display the visual reference. The lines of content information may be two or more lines of text if the one or more ancillary activities require only one line in visual reference, and one line of text if the one or more ancillary activities require more than one line. Each of the one or more ancillary activities may be based on an activity type, each activity type having a priority value, and wherein the one or more ancillary activities are displayed within the visual reference in order of their priority values. A single visual reference may comprise a first predetermined number of context and content lines if there are no other visual references in the notification list, and comprises a second predetermined number, less than the first predetermined number, of context and content lines if there are multiple visual references in the notification list.

The visual reference may include one or more thumbnail photos of users associated with one or more corresponding original activities. In this regard, method may further include automatically cropping the one or more thumbnail photos to highlight a face or faces of the respective users. The method may further include assigning to each visual reference a priority based on a time since the visual reference was last viewed and a time since a recent activity related to the visual reference, and displaying the visual references in the notification list in order of their respective assigned priorities.

In another aspect, a machine-readable medium may have instructions stored thereon that, when executed, cause a machine to perform a method of informing a user of recent activities in an online social network. In this regard, the method may include determining a recent activity related to a message posted in an activity stream of a social network, and providing, for display in a user notification list of the social network, one or more activity notifications, each activity notification related to a respective activity performed by a user in the social network, and comprising a first partial message derived from the posted message, and a second partial message derived from a reply to the posted message, wherein the recent activity is represented by at least one of the activity notifications, and wherein the notification list is provided for display within a web browser, outside the activity stream, above and at least partially overlapping a portion of a webpage related to the activity stream. Other aspects include corresponding systems, apparatus, and computer program products.

The previously described aspects and other aspects may include one or more of the following features. For example, each of the one or more activity notifications may be assigned a priority based on an activity type, the one or more activity notifications being displayed in the notification list in order according to their respective priorities. The second partial message may occupy a number of display lines across the activity notification based on a number of display lines occupied by the first partial message and a number of the activity representations in the notification list, a total number of display lines across the activity notification being less or equal to a predetermined maximum number of display lines. The first partial message may occupy a number of display lines across the activity notification based on a number of display lines occupied by the second partial message and a number of activity notifications in the notification list, a total number of display lines across the activity notification being less or equal to a predetermined maximum number of display lines. On a user-selection of the notification, the web browser may be navigated to the posted message and one or more replies to the posted message. A priority based on an activity type of the recent activity may be assigned to the notification, wherein the notification is displayed at a position in the notification list according to priority.

In a further aspect, a system may include one or more processors, and a memory. The memory may include server instructions thereon that, when executed, cause the one or more processors to store, in a database, context information corresponding to at least part of a message posted in an activity stream of a social network by a first user, store, in the database, content information including a recent activity related to posted message performed by a second user in response to the posted message, the recent activity including at least a portion of a reply message made in reply to the posted message, the content information further including one or more ancillary activities performed by one or more third users in response to the posted message, and cause notification instructions to be provided to a web browser located at a client device. The notification instructions, when executed by the client device, may facilitate causing the client device to receive an indication to display a notification list, on receiving the indication, provide the notification list for display in the web browser, outside a displayed activity stream, above and at least partially overlapping a portion of a webpage related to the displayed activity stream, and provide for display in the notification list, a visual reference to the posted message, the visual reference displaying the context information as one or more first display lines and the content information, including the at least the portion of the reply message and the one or more ancillary activities, as one or more second display lines.

These and other aspects may provide one or more of the following advantages. The viewing user may immediately understand the background of the notification, including the nature of the original activity and the extent to which the original activity is interesting to other users in the viewing user's social graph. In addition, by organizing the previously described visual reference in an easy and undemanding way, viewing users are saved cognitive resources measured in the effort and time that would otherwise be required to determine the nature of the original and ancillary activities, and may use that time to perform other tasks or activities within, or unrelated to, the social network.

It is understood that other configurations of the subject technology will become readily apparent from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

Figure 1:
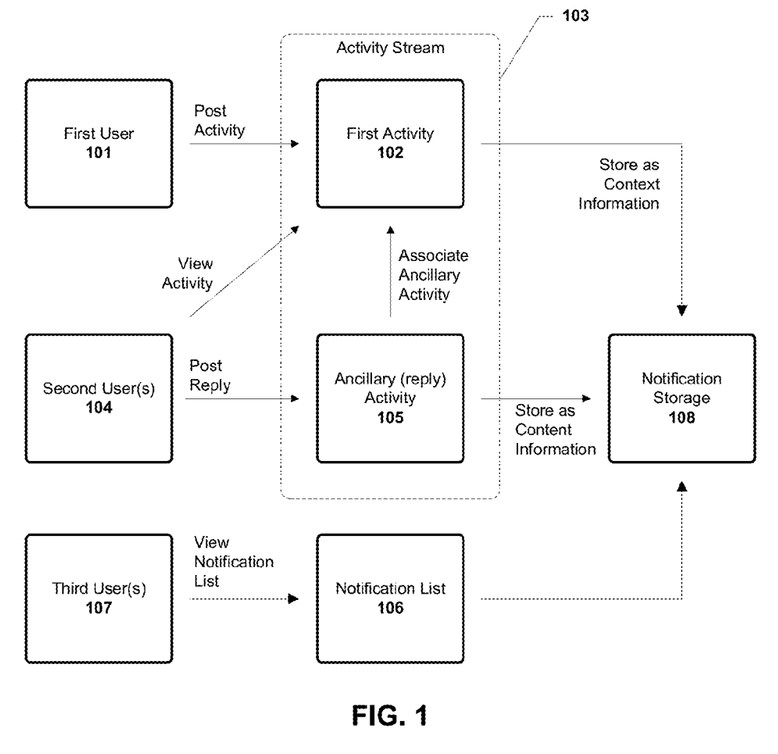
FIG. 1 is an diagram of example components for informing a user of recent activities in an online social network.

FIG. 1 is a diagram of example components for informing a user of recent activities in an online social network according to one aspect of the subject technology. One or more users of a social network may access an activity stream to post representations of their activities (including, for example, character-based messages, pictures, video, or the like), and to review activities posted by other users. For example, a first user 101 may post a first activity 102 to an activity stream 103. The posted activity may be representative of an activity performed by the first user in the online social network (for example, selected from a predetermined list of actions), including a message to another user, a message related to an interest of first user 101 (for example, a general post about an article the user read to all users in the user's social graph), or the like. One or more second users 104 may then post an ancillary activity 105 to activity stream 103 in reply to first activity 102. Ancillary activity 105 may include a character-based comment or a representation of a user action, for example, an expression of endorsement or disapproval of first activity 102, or a further sharing of first activity 102 to other users (for example, in a different social graph). An activity stream is provided as one example medium for displaying and sharing activities between users, and is merely one example of displaying such activities. In this regard, the activity stream of the subject technology may be interchangeable with any means in which online content is shared between users.

The social network may provide to authorized users, a notification list 106, outside of activity stream 102, for notifying the users (for example, third users 107) of recent activities related to an original activity posted to activity stream 103 by other users in the same social graph (for example, when first activity 102 or ancillary activity 105 is posted). The term "original activity," as used herein, describes an activity (for example, first activity 102) that starts a discussion between users, or prompts other activities, including the posting of one or more ancillary activities (for example, one or more ancillary activities 105). Notification list 106 may include a list of notifications. For example, one for each original activity. In this regard, each notification may be updated each time a user comments on, or otherwise performs a recent activity related to, the original activity (for example, each time a ancillary activity 105 is posted in reply to first activity 102).

As the number of ancillary activities related to an original activity (for example, replies to, and actions on, the original activity) increases, the context of the original activity may become lost. Fittingly, the subject technology may provide context information and content information for each notification (for example, in a notification storage 108), and may display the context and content information as part of a notification in order to convey to one or more third users 107 viewing the notification a clear understanding of not only a recent ancillary activity 105, but the original activity behind the ancillary activity.

In response to first activity 102, information about a first activity 102 may be grouped into context information, and information about one or more ancillary activities 105 may be grouped into content information. The context information may provide a background or description of first activity 102 by providing, for example, a small portion of a message related to first activity 102, or brief description of first activity 102. In this regard, the displayed context information saves a viewing user (for example, third user 107) the effort and time of having to click on the notification, and navigate away from a currently displayed webpage, to view the activities behind the notification, or by otherwise saving the user the extra cognitive work related to remembering why the notification is being displayed. Similarly, the content information may provide a visual summary of one or more ancillary activities 105 posted in reply to first activity 102. The summary may provide the viewing user with a complete picture of the notification, facilitating the viewing user in deciding whether or not one or more of the activities related to the notification are interesting to the user. The user may then use the context and content information in deciding whether to click on the notification to view first activity 102, or to close notification list 106 altogether, saving the time and effort required to click and scan the activities related to the notification on another webpage.

In one aspect, the stored context information may include a part of first activity 102 (for example, the first n characters of text), or, if first activity 102 is an action, a message describing the action performed. In this regard, the one or more context lines may be based on predefined text or text derived from the original action. For example, if first activity 102 was generated as a result of another user adding the notified user to a social graph, then the context information may include predefined text stating that "User A has added you to their social graph." In some aspects, the context information may further include a reference to the user who posted the posted activity (for example, a name or partial name).

The content information may include a representation of ancillary activity 105. For example, the content information may include representations of one or more ancillary activities performed by users in response to first activity 102. In some aspects, the content information may include a display of a number of users who designated an endorsement or disapproval of the subject activity, or who have shared the subject activity with others, the names of the users doing so, one or more partial comments posted to an activity stream in reply to an original activity, whether the original activity was mentioned in another posted activity, or one or more thumbnail photos related to the original or ancillary activities. For example, the subject technology may, on receiving an indication of one or more ancillary activities 105, determine one or more descriptions of the activities. In one aspect, the description may include at least a portion of a message describing a most recent of the one or more ancillary activities. In another aspect, the description may include a numerical grouping representative of a group of users performing the same or similar activity (for example, the number of users endorsing first activity 102).

The context information and content information may be used to assemble one or more lines of context information and one or more lines of content information, respectively, for use in a visual reference displayed to interested third users 107 as a single notification in notification list 106. Each visual reference may be concise, in that it may organize a short description of a first activity 102 together with a short description of one or more related ancillary actions 105 within a predetermined number (for example, three or four) of lines on a display. Each visual reference may also include a link to the original activity. For example, on a user-selection of the visual reference or text within the visual reference related to first activity 102, the web browser of third user 107 may be redirected to activity stream 103 to display first activity 102 and, if available, one or more second activities 105.

Figure 2:
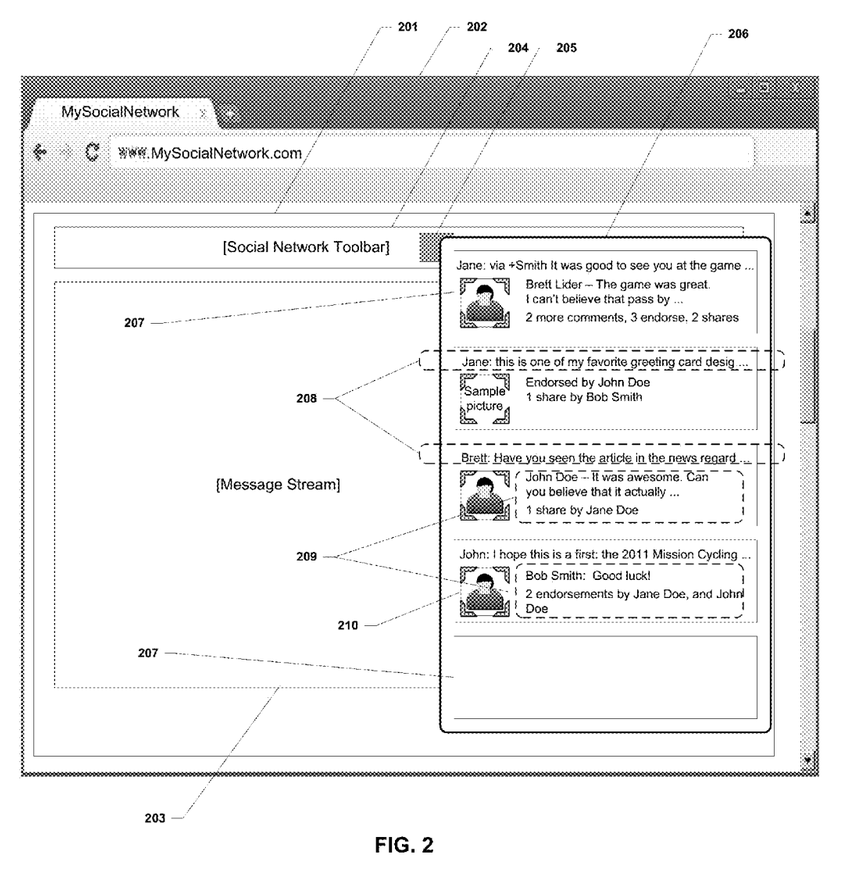
FIG. 2 depicts an example webpage of a social network, displayed by a web browser, including an interactive activity stream and a social networking toolbar.

FIG. 2 depicts an example webpage 201 of a social network, displayed by a web browser 202, including an interactive activity stream 203 and a social networking toolbar 204 according to one aspect of the subject technology. Web browser 202 may be displayed on a client computing device, for example, a smartphone, GPS navigation device, or personal computer, tablet computer, PDA, a television or other display device with one or more location-aware computing devices embedded therein or attached thereto, or the like. Activity stream 203 may include a sequential display of information where users' activities are streamed in substantially real-time. Activity stream 203 may be viewable by only a single user, or may be shared between users with each user viewing only those activities that are relevant to the user viewing the activity. Social networking toolbar 204 may include a number of buttons for the manipulation of the social network, including activity stream 203. Toolbar 204 may further include a control 205 that, when activated, displays a notification list 206 within web browser 202, above and at least partially overlapping a portion of webpage 201. In some aspects, notification list 206 may float (for example, above activity stream 203), and may be repositioned within web browser 202 by the user. Notification list 206 may be generated, for example, by instructions (for example, scripting language) embedded within webpage 201.

As described previously, notification list 206 may include one or more notifications 207. Each notification 207 may be generated as a result of a recent activity within activity stream 203, the recent activity being, for example, the posting of an original activity to activity stream 203, or one or more ancillary activities made by one or more other users in response to the original activity. In this manner, notification list 206 may provide a concise listing of recent activities of users within the social graph of the user viewing notification list 206. Each notification 207 may function as a visual link to a respective original activity (for example, first activity 102) in activity stream 203, such that, when activated (for example, by clicking on an area of a display screen corresponding to notification 207), web browser 202 may be navigated to a webpage that displays the original activity and the one or more ancillary activities (for example, as displayed in activity stream 203).

To convey the significance of a recent activity in activity stream 203, notification 207 may include a concise visual organization of both the previously described context information and content information. In this regard, notification 207 may include one or more lines of context information 208, including, for example, at least a portion of text from a user-generated message (for example, derived from an original activity) or a predetermined phrase or text describing a user activity (for example, resulting from an action taken by the user in the social network). In one example, the one or more context lines may include a reference to the user who posted the activity (for example, the user's name or partial name) and a predetermined number of characters from the posted activity (for example, part of the first line of text in the posted activity).

Notification 207 may further include one or more lines of content information 209, including, for example, a display of one or more ancillary activities made in reply to an original activity. The display of each ancillary activity may include one or more partial comments posted to activity stream 203 in reply to the original activity, whether the original activity was mentioned in another posted activity, one or more names of the users performing an original or ancillary activity, or the like. The display of each ancillary activity may also include a count, for example, a number of users who designated an endorsement or disapproval of a referenced original activity, a number of users who have shared the original activity with others, or the like. In one aspect, each of previously described types of activities may be assigned (for example, by the system) a predetermined priority value. On display of content information 209 within notification 207, the one or more displayed ancillary activities (for example, endorsements, comments, and shares) may be displayed in order of their respective priority values (for example, first comments, then endorsements, then shares). In another aspect, recently updated content information (for example, number of shares, endorsements, or the like) may receive the highest priority and be displayed first, or by itself (for example, on one line) within notification 207.

In another aspect, each notification 207 may contain a read state. A notification 207 may change its read state (for example, from "not viewed" to "viewed") on being selected by a user to display the original activity, or merely upon display of notification 207 to the user within notification list 206. In some aspects, notification 207 may be removed from notification list 206 (for example, auto-hide) three days after being read, if, for example, no recent activities related to notification 207 were posted to the activity stream 203 since the time notification 207 was last viewed. In another aspect, notification 207 or one or more components thereof (for example, ancillary activities) may be deemphasized on a subsequent viewing of notification 207 or its referenced activities. For example, already viewed content may be grayed out or omitted from notification 207. In further aspects, the text color of content or context information may be determined based on priority or type of content. For example, primary content (for example, unread or important content) may be black, and secondary content (for example, already read) may be grey. Users replying to an original activity 102 may be displayed in a different color (for example, blue) or typeface, and the name of a user may or may not function as a link to a corresponding profile page of the user. In some aspects, timestamps and trailing periods, for example, may be omitted from notification 207 to conserve visual space.

The total number of characters included in the one or more displayed lines of context information and content information may automatically be adjusted to show a maximum amount of information in the least amount of visual space. The number of lines used to display a message (or portion thereof) related to a recent activity in notification 207 (for example, as an ancillary action) may be set to a predetermined maximum number of lines (for example, two) if the number of other ancillary activities is below a predetermined maximum number of activities (for example, three), or other ancillary activities may be displayed within the same number of lines (for example, at the end) or without increasing a total number of lines used to display all information in notification 207 (for example, three). In another aspect, the number of lines used to display content information may be adjusted based on whether the recent activity is an original activity, the number of ancillary activities to be displayed within the content lines, and the like.

In one aspect, a notification 207 may display up to a first predetermined maximum number of context and content lines (for example, three or four lines), if there are no other notifications in notification list 206, or there are below a predetermined number of notifications (for example, two or three notifications) in the list. This number may be reduced to a second predetermined maximum number of context and content lines (for example, two) if, for example, there are more than the predetermined number of notifications in notification list 206 (for example, more than two or three). Furthermore, the number of lines of context information used to display a message corresponding to an original activity may be based on a number of lines of content information used to display a message related to a recent activity, or vice versa, with the total number of lines used to display the notification being less or equal to a the previously described first or second predetermined maximum number of context and content lines. In another example, the number of lines used to display context information may be limited to two or three lines of text if there are no ancillary actions, limited to two lines of text if there is at least one ancillary activity, and limited to one line of text if, for example, a display of the ancillary activities would require more than one line of notification 207.

Each notification 207 may be assigned a priority value based on a time since the notification was last viewed, or based on a time since a recent activity related to the notification. The notifications may then be displayed in order of their respective assigned priorities. A notification that has already been viewed may automatically receive the lowest priority, while a notification having one or more activities that have not yet been viewed may receive a higher priority according to the time since the most recent unviewed activity. For example, unread notifications 207 may be listed first in notification list 206. If two notifications include recent activity that have not yet been viewed, the notification corresponding to the most recent activity may be displayed first, followed by the notification corresponding to the older unviewed activity, or vice versa.

In one aspect, a notification 207 may also include one or more thumbnail photos 208 related an original or recent activity. For example, thumbnail photo 210 may include a picture of a user who posted the original activity to activity stream 203, a picture posted by the user as the subject of an activity, a picture associated with an article posted to activity stream 203, or the like. Multiple thumbnail photos 208 may be displayed in a single notification 207, for example, where the notification aggregates multiple original activities by multiple respective users (for example, in a notification related to multiple users being added to a social graph). If a thumbnail photo 210 includes a picture of a user, thumbnail photo 210 may be automatically be cropped to highlight the face or faces of the user.

A user may view a display of notification list 206 outside his or her activity stream 203. Notification list 206 may include one or more of the previously described visual references, each related to a recent activity in activity stream 203. On a user-selection of the visual reference, web browser 202 may be redirected to activity stream 203 to display a corresponding message posted to describe in detail the original or ancillary activities. The message post may also include a detailed description of the original activity and the one or more ancillary activities performed in response to the original activity.

Figure 3:
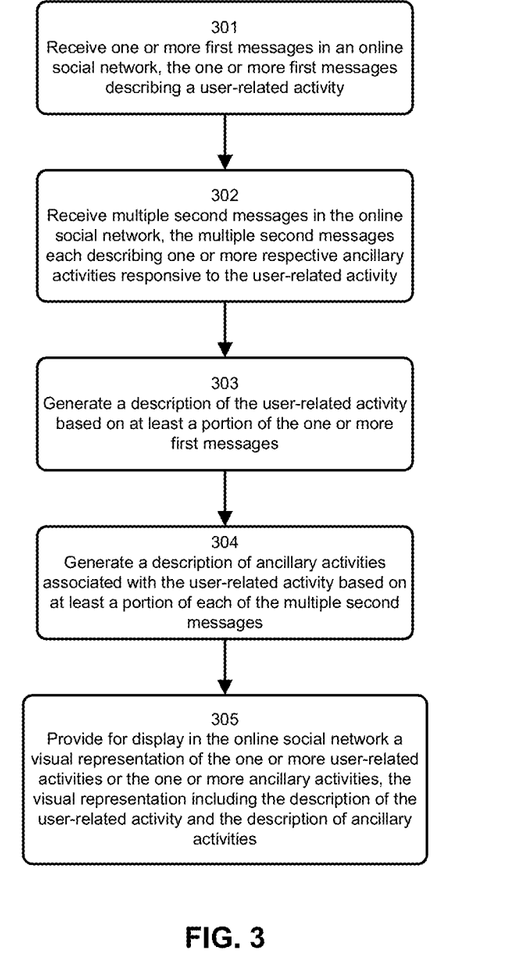
FIG. 3 is a flowchart illustrating a first example process for informing a user of recent activities in an online social network.

FIG. 3 is a flowchart illustrating a first example process for informing a user of recent activities in an online social network according to one aspect of the subject technology. According to some aspects, the blocks of FIG. 3 may be executed by one or more computing devices (for example, a desktop or server computer, tablet or notebook computer, personal data assistant, smart phone, a television or other display device with one or more computing devices embedded therein or attached thereto, or the like). In this regard, the blocks of FIG. 3 may be performed within the context of an online social network application displayed by the one or more computing devices.

In block 301, one or more first messages is received in an online social network, the one or more first messages describing a user-related activity. The messages may be received by way of a post to a message stream and/or may be viewable within the message stream to one or more users of the online social network. In block 302, multiple second messages are received in the online social network, the multiple second messages each describing one or more respective ancillary activities responsive to the user-related activity. Accordingly, the second messages may be received by way of reply posts to the original post. The ancillary activities may include, for example, text-based responses, an ongoing forum dialogue, affirmations of approval or disapproval, an action of sharing the original post with other users (for example, further post, email, or the like), or the like).

In block 303, a description of the user-related activity is generated based on at least a portion of the one or more first messages. The description may include, for example, the first predetermined number of characters or words of a message, such as to impart to the reader the general context of the user-related activity. In some aspects, the words included in the description may be automatically selected by way of comparison of the message with key words and phrases in order to select portions of the message that likely convey the general context of the user-related activity based on known user activities.

In block 304, a description of ancillary activities associated with the user-related activity is generated based on at least a portion of each of the multiple second messages. The description of ancillary actions may be generated in the same manner as previously described with regard to the user-related activity (for example, selection of words, predetermined number of characters, and the like). In some aspects, the description of ancillary activities may comprise multiple activity representations of respective ancillary activities. For example, multiple users may have replied to the first message, and each ancillary action may represent one of those replies. The multiple activity representations may also be displayed in an ordered manner, according to a priority assigned to the respective ancillary activities.

In block 305, a visual representation of the one or more user-related activities or the one or more ancillary activities is providing for display in the online social network, the visual representation including the description of the user-related activity and the description of ancillary activities. In one aspect, the visual representation may be included within a notification list, provided for display within a web browser, above and at least partially overlapping a portion of a webpage related to the online social network. The visual representation may also be assigned a priority within the notification list with respect to other visual representations. The priority may be based on a type of the user-related activity or an associated ancillary activity.

Figure 4:
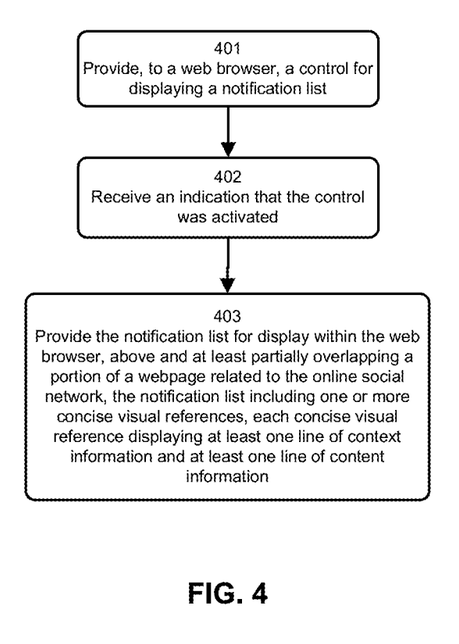
FIG. 4 is a flowchart illustrating a second example process for informing a user of recent activities in an online social network.

FIG. 4 is a flowchart illustrating a second example process for informing a user of recent activities in an online social network according to one aspect of the subject technology. In block 401, a web browser is provided with a control for displaying a notification list. For example, the control may be a selectable button on a toolbar displayed in the social network. In block 402, an indication that the control was activated (for example, by a user-generated mouse click). On receiving the indication that the control was activated, in block 403, the notification list may be provided for display within the web browser, above and at least partially overlapping a portion of a webpage related to the online social network.

In this example process, the notification list includes one or more visual references (for example, notifications), with each visual reference displaying at least one line of context information and at least one line of content information, the context information including a part of a message describing an original activity performed by a user in the online social network, and the content information including a concise representation of one or more ancillary activities made by other users in response to the original activity. By providing the context and content information within a notification, a viewing user may immediately understand the background of the notification, including the nature of the original activity and the extent to which the original activity is interesting to other users in the viewing user's social graph. And, by organizing the previously described visual reference in an easy and undemanding way, viewing users may be saved cognitive resources measured in the effort and time that may otherwise be required to determine the nature of the original and ancillary activities, and may use that time to perform other tasks or activities within, or unrelated to, the social network.

Figure 5:
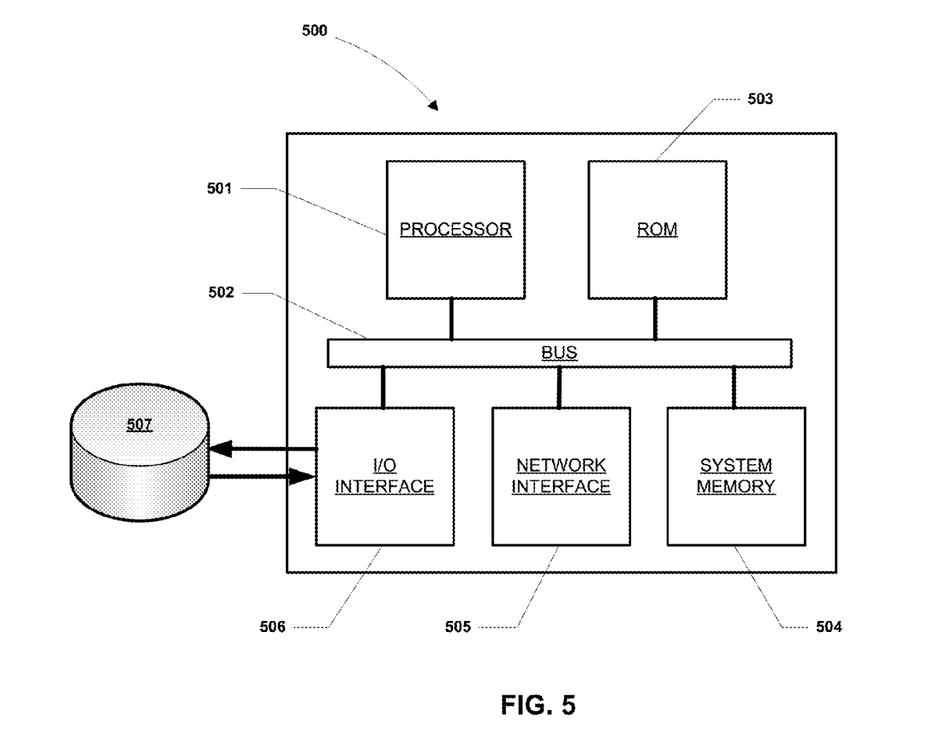
FIG. 5 is a diagram illustrating an example server system for informing a user of recent activities in an online social network.

FIG. 5 is a diagram illustrating an example computing system for informing a user of recent activities in an online social network, including a processor and other internal components, according to one aspect of the subject technology. In some aspects, a computerized device 500 (for example, a computing device responsible for hosting a social network that includes activity stream 103, a computing device for displaying web browser 202, or the like) includes several internal components such as a processor 501, a system bus 502, read-only memory 503, system memory 504, network interface 505, I/O interface 506, and the like. In one aspect, processor 501 may also be communication with a storage medium 507 (for example, a hard drive, database, or data cloud) via I/O interface 506. In some aspects, all of these elements of device 500 may be integrated into a single device. In other aspects, these elements may be configured as separate components.

Processor 501 may be configured to execute code or instructions to perform the operations and functionality described herein, manage request flow and address mappings, and to perform calculations and generate commands. Processor 501 is configured to monitor and control the operation of the components in server 500. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on a ROM within processor 501. Likewise, one or more sequences of instructions may be software stored and read from ROM 503, system memory 504, or received from a storage medium 507 (for example, via I/O interface 506). ROM 503, system memory 504, and storage medium 507 represent examples of (for example, non-transitory) machine or computer readable media on which instructions/code may be executable by processor 501. Machine or computer readable media may generally refer to any medium or media used to provide instructions to processor 501, including both volatile media, such as dynamic memory used for system memory 504 or for buffers within processor 501, and non-volatile media, such as electronic media, optical media, and magnetic media.

In some aspects, processor 501 is configured to communicate with one or more external devices (for example, via I/O interface 506). Processor 501 is further configured to read data stored in system memory 504 or storage medium 507 and to transfer the read data to the one or more external devices in response to a request from the one or more external devices. The read data may include one or more web pages or other software presentation to be rendered on the one or more external devices. The one or more external devices may include a computing system such as a personal computer, a server, a workstation, a laptop computer, PDA, smart phone, and the like.

In some aspects, system memory 504 represents volatile memory used to temporarily store data and information used to manage device 500. According to one aspect of the subject technology, system memory 504 is random access memory (RAM) such as double data rate (DDR) RAM. Other types of RAM also may be used to implement system memory 504. Memory 504 may be implemented using a single RAM module or multiple RAM modules. While system memory 504 is depicted as being part of device 500, those skilled in the art will recognize that system memory 504 may be separate from device 500 without departing from the scope of the subject technology. Alternatively, system memory 504 may be a non-volatile memory such as a magnetic disk, flash memory, peripheral SSD, and the like.

I/O interface 506 may be configured to be coupled to one or more external devices, to receive data from the one or more external devices and to send data to the one or more external devices. I/O interface 506 may include both electrical and physical connections for operably coupling I/O interface 506 to processor 501, for example, via the bus 502. I/O interface 506 is configured to communicate data, addresses, and control signals between the internal components attached to bus 502 (for example, processor 501) and one or more external devices (for example, a hard drive). I/O interface 506 may be configured to implement a standard interface, such as Serial-Attached SCSI (SAS), Fiber Channel interface, PCI Express (PCIe), SATA, USB, and the like. I/O interface 506 may be configured to implement only one interface. Alternatively, I/O interface 506 may be configured to implement multiple interfaces, which are individually selectable using a configuration parameter selected by a user or programmed at the time of assembly. I/O interface 506 may include one or more buffers for buffering transmissions between one or more external devices and bus 502 or the internal devices operably attached thereto.

Various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of blocks in the processes disclosed is an illustration of example approaches. Based upon design preferences, it is understood that the specific order or hierarchy of blocks in the processes may be rearranged. Some of the blocks may be performed simultaneously. The accompanying method claims present elements of the various blocks in a sample order, and are not meant to be limited to the specific order or hierarchy presented.

The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The term website, as used herein, may include any aspect of a website, including one or more web pages, one or more servers used to host or store web related content, and the like. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A computer-implemented method, comprising:
   receiving one or more first messages posted by a user to an activity stream in an online social network, the one or more first messages describing a user-related activity of the user;
   receiving multiple second messages posted to the activity stream by other users in the online social network, the multiple second messages each responsive to the one or more first messages and describing one or more respective ancillary activities associated with the user-related activity performed in the online social network;
   generating, from at least a portion of the one or more first messages, a textual description of the user-related activity different from the one or more first messages;
   generating, from at least a portion of the multiple second messages, a description of multiple ancillary activities associated with the user-related activity;
   providing for display in the online social network a single notification comprising the generated description of the user-related activity and the generated description of the multiple ancillary activities; and
   responsive to receiving a user selection of the single notification, providing for display in the web browser the activity stream including the one or more first messages describing the user-related activity and the multiple second messages describing the one or more ancillary activities.

2. The computer-implemented method of claim 1, wherein providing the single notification for display comprises:
   on receiving the multiple second messages, generating a notification list that includes the single notification; and
   providing the notification list for display within a web browser, above and at least partially overlapping a portion of a webpage related to the online social network.

3. The computer-implemented method of claim 2, further comprising:
   assigning to the single notification a priority in the notification list with respect to other notifications, the priority based on a type of the user-related activity or an associated ancillary activity.

4. The computer-implemented method of claim 1, wherein at least a portion of the description of multiple ancillary activities is automatically deemphasized within the single notification on a subsequent display of the single notification or the notification list.

5. The computer-implemented method of claim 1, wherein the description of multiple ancillary activities comprises multiple activity representations of respective ancillary activities, the multiple activity representations displayed in order according to a priority of the respective ancillary activities.

6. A computer-implemented method, comprising:
   providing, to a web browser, a control for displaying a notification list
   receiving an indication that the control was activated;
   on receiving the indication, providing the notification list for display within the web browser, above and at least partially overlapping a portion of a webpage related to an online social network;
   wherein the notification list includes multiple visual references, each visual reference displaying a single notification comprising at least one line of context information and at least one line of content information, the context information including a part of a message in an activity stream describing one or more original activities performed by a user in the online social network, and the content information including a concise representation of one or more ancillary activities performed by other users in the online social network associated with the one or more original activities and responsive to the message in the activity stream; and
   responsive to receiving a user selection of the single notification, providing for display in the web browser the activity stream including the one or more first messages describing the user-related activity and the multiple second messages describing the one or more ancillary activities.

7. The computer-implemented method of claim 6, wherein each visual reference includes a link to a display of the one or more original activities and the one or more ancillary activities.

8. The computer-implemented method of claim 6, wherein one or more viewed ancillary activities is deemphasized on a subsequent view of the visual reference and the one or more viewed ancillary activities by an interested user.

9. The computer-implemented method of claim 6, further comprising:
   removing a viewed visual reference from the notification list a predetermined amount of time after the visual reference is viewed by an interested user.

10. The computer-implemented method of claim 6, wherein a predetermined number of lines are used for displaying a message related to a recent one of the one or more ancillary activities if the one or more ancillary activities can be displayed without increasing a total number of lines used to display the visual reference.

11. The computer-implemented method of claim 6, wherein the at least one line of content information comprise two or more lines of text if the one or more ancillary activities require only one line in the visual reference displaying the at least one line of content information, and one line of text if the one or more ancillary activities require more than one line in the visual reference.

12. The computer-implemented method of claim 6, wherein each of the one or more ancillary activities is based on an activity type, each activity type having a priority value, and wherein the one or more ancillary activities are displayed within the visual reference in order of their priority values.

13. The computer-implemented method of claim 6, wherein the visual reference includes one or more thumbnail photos of users associated with one or more corresponding original activities, the method further comprising:
   automatically cropping the one or more thumbnail photos to highlight a face or faces of the respective users.

14. The computer-implemented method of claim 6, wherein a single visual reference comprises a first predetermined number of context and content lines if there are no other visual references in the notification list, and comprises a second predetermined number, less than the first predetermined number, of context and content lines if there are multiple visual references in the notification list.

15. The computer-implemented method of claim 6, further comprising:
   assigning to each visual reference a priority based on a time since the visual reference was last viewed and a time since a recent activity related to the visual reference; and
   displaying the visual references in the notification list in order of their respective assigned priorities.

16. A non-transitory machine-readable medium having instructions stored thereon that, when executed, cause a machine to perform a method of providing a notification list, the method comprising:
   determining a recent activity related to a message posted by a first user in an activity stream of an online social network;
   providing, for display in a user notification list of the social network, one or more activity notifications, each activity notification related to a respective activity performed by a respective user in the online social network, and each activity notification comprising a first partial message derived from the message posted by the first user in the activity stream and a second partial message derived from multiple replies to the message posted in the activity stream by the first user, the multiple replies being performed by at least one second user in the online social network,
   wherein the recent activity is represented by one of the activity notifications, and wherein the notification list is provided for display within a web browser, outside the activity stream, above and at least partially overlapping a portion of a webpage related to the activity stream;
   responsive to receiving a user selection of the single notification, providing for display in the web browser the activity stream including the one or more first messages describing the user-related activity and the multiple second messages describing the one or more ancillary activities.

17. The non-transitory machine-readable medium of claim 16, wherein each of the one or more activity notifications is assigned a priority based on an activity type, the one or more activity notifications being displayed in the notification list in order according to their respective priorities.

18. The non-transitory machine-readable medium of claim 16, wherein the second partial message occupies a number of display lines across the activity notification based on a number of display lines occupied by the first partial message and a number of the activity notifications in the notification list, a total number of display lines across the activity notification being less or equal to a predetermined maximum number of display lines.

19. The non-transitory machine-readable medium of claim 16, wherein the first partial message occupies a number of display lines across the activity notification based on a number of display lines occupied by the second partial message and a number of activity notifications in the notification list, a total number of display lines across the activity notification being less or equal to a predetermined maximum number of display lines.

20. A system, comprising:
   one or more processors; and
   a memory, the memory including server instructions thereon that, when executed, cause the one or more processors to:
   store, in a database, context information corresponding to at least part of a message posted in an activity stream of an online social network by a first user;
   store, in the database, content information including a recent activity related to the posted message, the recent activity performed by a second user in the online social network in response to the posted message, the recent activity including at least a portion of a reply message made by the second user in reply to the posted message, the content information further including one or more ancillary activities performed in the online social network by one or more third users in response to the posted message; and
   cause notification instructions to be provided to a web browser located at a client device, the notification instructions, when executed by the client device, facilitate causing the client device to:
   receive an indication to display a notification list;
   on receiving the indication, provide the notification list for display in the web browser, outside a displayed activity stream of the online social network, above and at least partially overlapping a portion of a webpage related to the displayed activity stream;
   provide for display in the notification list, a single notification of the posted message, the single notification comprising a display of the context information as one or more first display lines and the content information, including the at least the portion of the reply message and the one or more ancillary activities, as one or more second display lines; and
   responsive to receiving a user selection of the single notification, providing for display in the web browser the activity stream including the one or more first messages describing the user-related activity and the multiple second messages describing the one or more ancillary activities.

* * * * *